US012231811B1

(12) United States Patent
    Balaji

(10) Patent No.: US 12,231,811 B1
(45) Date of Patent: *Feb. 18, 2025

(54) VIDEO CONFERENCING INTEGRATION FOR THIRD PARTY APPLICATIONS

(71) Applicant: Zoom Video Communications, Inc., San Jose, CA (US)

(72) Inventor: Abhishek Balaji, Westborough, MA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,030

(22) Filed: Jun. 22, 2023

Related U.S. Application Data

(63) Continuation of application No. 17/513,367, filed on Oct. 28, 2021, now Pat. No. 11,716,445.

(51) Int. Cl.
  *H04N 7/15* (2006.01)
  *G06F 3/0482* (2013.01)
  *H04L 12/18* (2006.01)

(52) U.S. Cl.
  CPC ............. *H04N 7/15* (2013.01); *G06F 3/0482* (2013.01); *H04L 12/1818* (2013.01)

(58) Field of Classification Search
  CPC .......... H04N 7/15; H04N 7/147; H04N 7/152; G06F 3/0482; H04L 12/1818; H04L 65/403; H04L 12/18
  See application file for complete search history.

(56) References Cited

U.S. PATENT DOCUMENTS

| | | |
|---|---|---|
| 2007/0172044 A1 | 7/2007 | Nguyen |
| 2009/0240770 A1* | 9/2009 | Kalipatnapu ....... H04L 12/1818 709/204 |
| 2011/0268262 A1 | 11/2011 | Jones et al. |
| 2011/0270921 A1 | 11/2011 | Jones et al. |
| 2011/0271209 A1* | 11/2011 | Jones ...................... H04L 67/75 715/753 |
| 2015/0097922 A1* | 4/2015 | Le Devehat .......... H04M 3/567 348/14.08 |
| 2016/0277455 A1* | 9/2016 | Xi ........................... H04L 67/52 |
| 2019/0019162 A1 | 1/2019 | Yang et al. |

OTHER PUBLICATIONS

U.S. Appl. No. 17/513,367, "Non-Final Office Action", filed Aug. 19, 2022, 16 pages.
U.S. Appl. No. 17/513,367, "Notice of Allowance", filed Mar. 15, 2023, 5 pages.

* cited by examiner

*Primary Examiner* — Yosef K Laekemariam
(74) *Attorney, Agent, or Firm* — Kilpatrick Townsend & Stockton LLP

(57) ABSTRACT

Provided herein are methods and systems for a video conference widget for scaled integration. The video conference widget may include a self-contained software module that defines a plurality of video conferencing functions associated with the functionality provided by a video conference provider. The video conference widget may receive a command for a first video conference function from a software interface of a software application that is separate from the video conference widget. In response to the command, the video conference widget may output a signal to a video conference provider to perform the video conference function.

20 Claims, 11 Drawing Sheets

VIDEO CONFERENCING INTEGRATION FOR THIRD PARTY APPLICATIONS

RELATED APPLICATIONS

The present application is a continuation of, and claims priority to U.S. application Ser. No. 17/513,367, filed Oct. 28, 2021 and titled "VIDEO CONFERENCING INTEGRATION FOR THIRD PARTY APPLICATIONS," the entirety of which is incorporated by reference herein.

FIELD

The present application generally relates to hosting or participating in video conferences and more particularly relates to video conference widgets for scaled integration of video conferencing systems across various platforms.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION OF THE DRAWINGS

Figure 1:
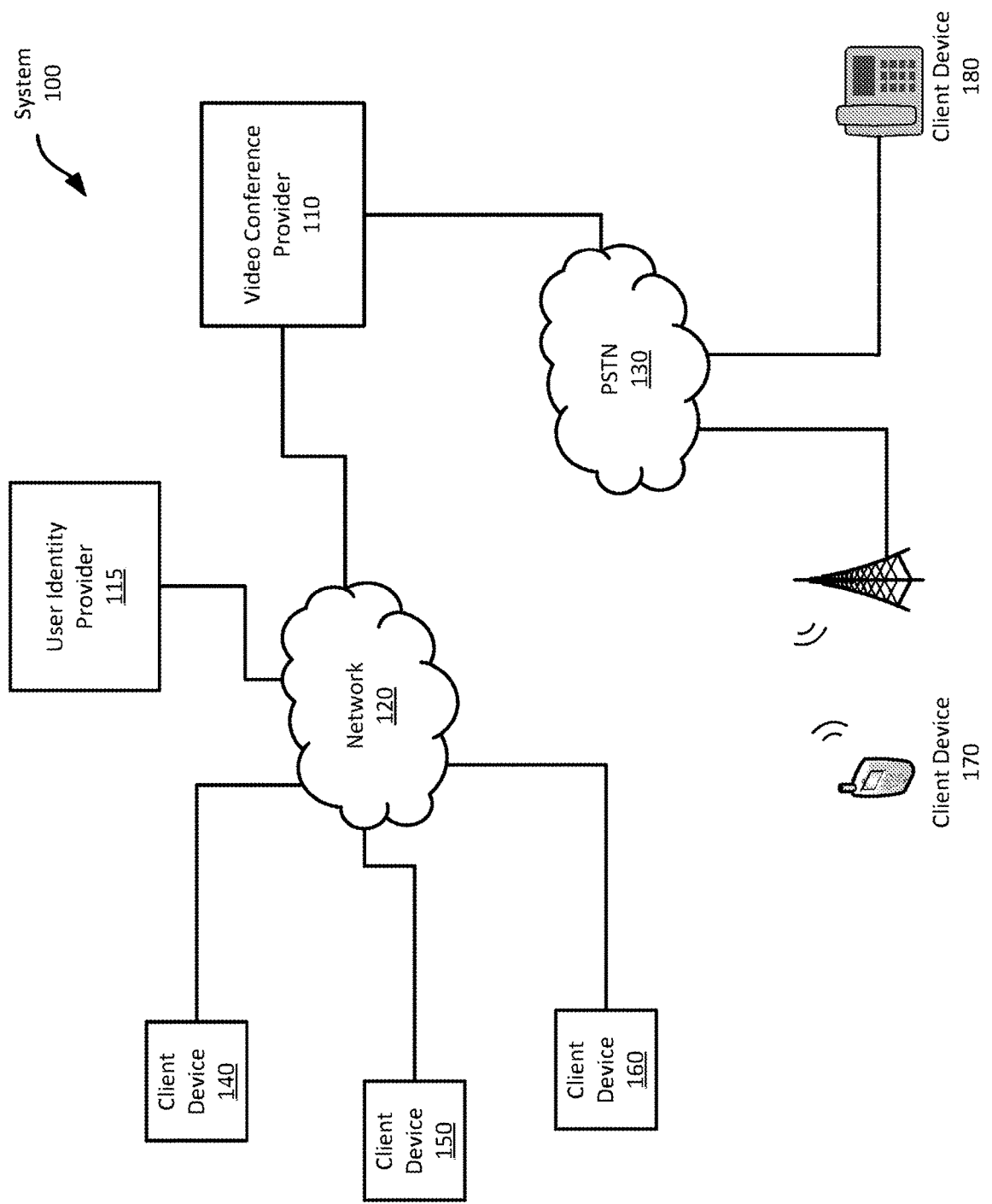
FIGS. 1-2 show example systems for various video conference functionality according to an embodiment of the present disclosure.

Examples are described herein in the context of systems and methods for video conference widgets for scaled integration of video conferencing systems across various platforms. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. In some cases, organizations may wish to integrate various components of the video conference process into their workflow. While organizations can develop applications powered by a video conference provider's framework, presently, this does not support organizations looking to build workflows around various video conferencing activities (e.g., start/join a meeting, scheduling a meeting, and interacting with meeting recordings). Presently, to allow development of integration of a video conference provider's components into an organization's platform or application, either the video conference provider has to provide the integration itself or educate the organization on the nuances of the video conferencing workflow. Both of these are time consuming and costly.

To allow integration of video conferencing components across various platforms and applications, video conference widgets are provided. Video conference widgets may be modularized components that allow for easy integration into an organization's application and/or platform. A widget is an easy-to-use software application or component of software that is compatible with one or more different software platforms. A widget allows for simple integration of a software module into an established software platform. The code of software contained within a widget typically contains one or more functions that are not present in the software platform. The integration of a widget into the software platform allows for integration of the widget's function into the software platform without the need to manually integrate the video conference functionality into the existing software application, including managing interactions with the video conference provider.

Video conferencing widgets discussed herein provide a low-code solution to integrate various video conferencing functions into one or more different software platforms. For example, a video conference widget may provide a function of starting an ad-hoc video conference. Integration of the video conference widget into a software platform would allow the corresponding application to provide the functionality of starting an ad-hoc video conference without leaving the application. For example, a video conference widget may be provided to a user on a banner or ribbon of the application's user interface.

Currently to provide various video conference functions, such as starting an ad-hoc meeting, scheduling a meeting, or joining a meeting, a user would have to leave the application and go to the video conference provider's platform to schedule the meeting or start a new ad-hoc meeting. The present video conference widgets provide the video conference functions at the application level, allowing a user to invoke a desired video conference function without leaving the application. Other advantages of video conferencing widgets are described in the below discussion.

This illustrative example is given to introduce the reader to the general subject matter discussed herein and the disclosure is not limited to this example. The following sections describe various additional non-limiting examples and examples of systems and methods for compliance auditing encrypted video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
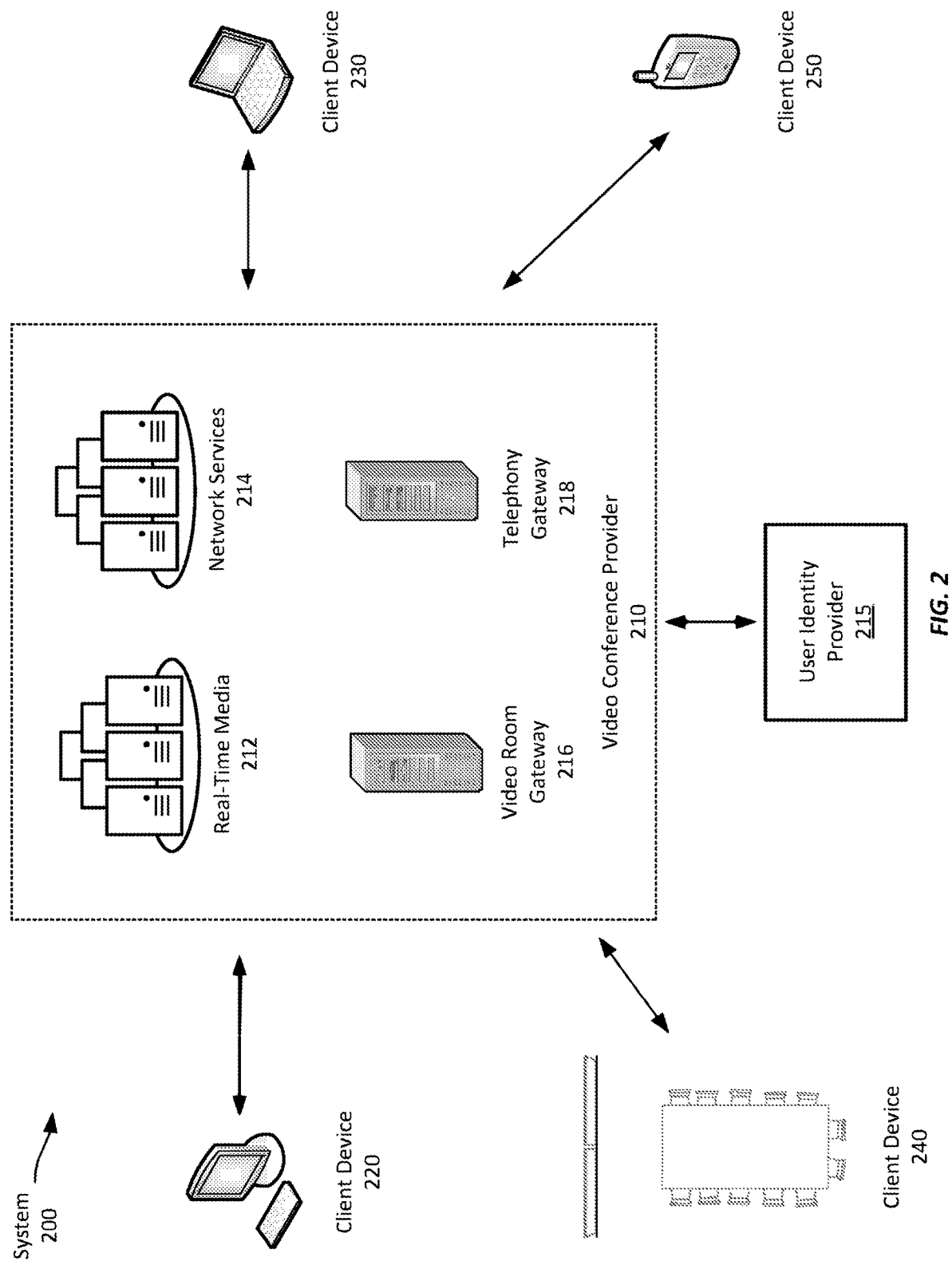

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

To allow for ease of integration into an organization's application or platform, one or more components of a video conferencing workflow may be modularized into a widget. A widget may be generally understood as an interface element that embodies particular functionality, such as a button or scroll bar, that has a well-defined interface, such as an application programming interface (API), for receiving inputs and providing outputs. A widget may be its own self-contained module of executable code or may be incorporated within a larger software application directly or as a part of a library (e.g. a dynamically-linked library).

A video conferencing workflow may include a variety of steps or actions. One or more widgets may be used to integrate one or more actions of the video conferencing workflow into an organization's application. For example, a video conferencing workflow may include a 'schedule a video conference' action, a 'start a video conference' action, a 'join a video conference' action, a 'provide recordings from a video conference' action, a 'provide a list of upcoming video conferences' action, and 'a view a video conferencing participant profile' action. A widget corresponding to one or more of the video conference workflow actions may provide a simple integration tool for an organization to incorporate the video conferencing action into one or more of the organization's applications or platforms.

Figure 3:
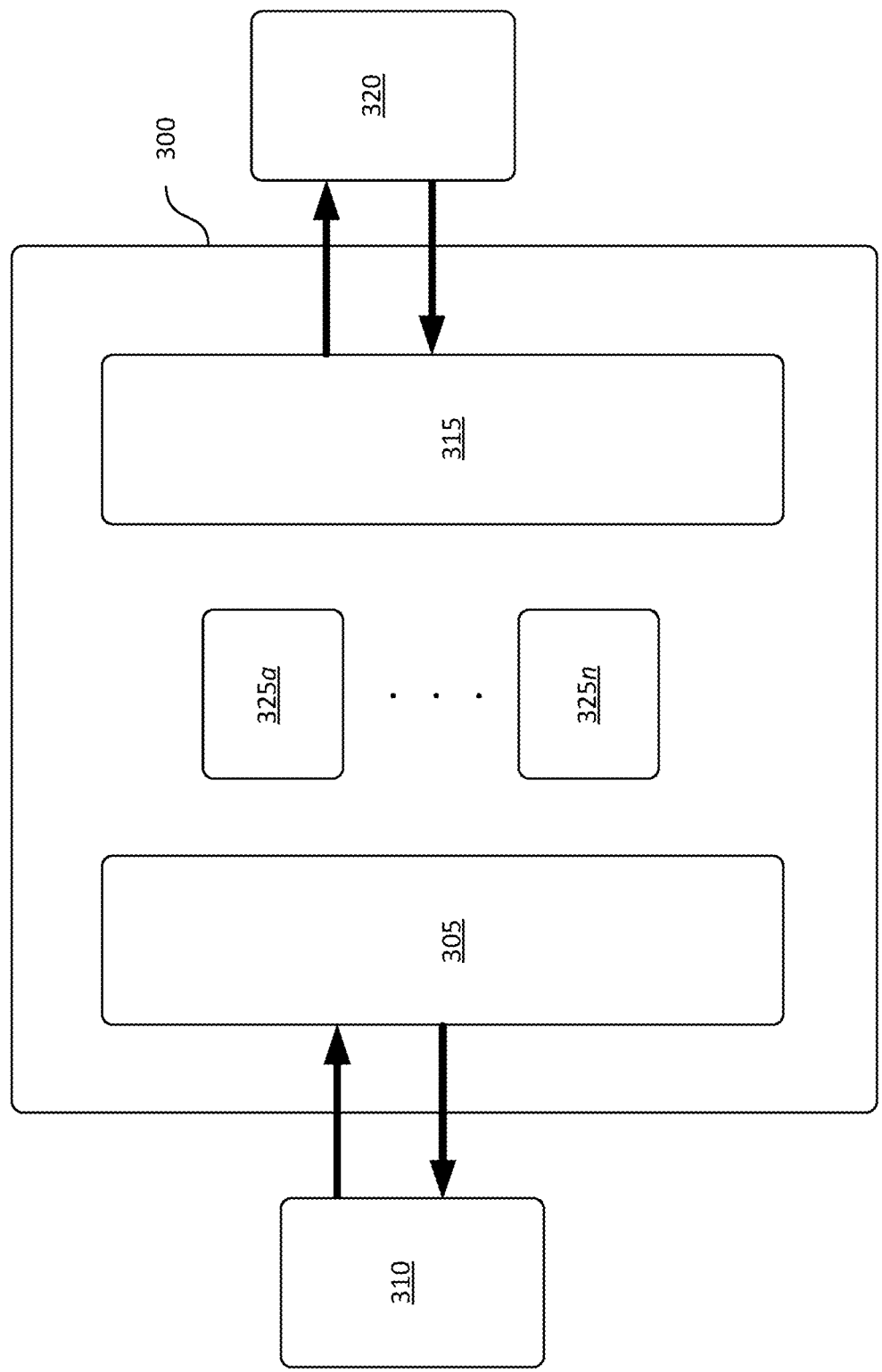
FIG. 3 illustrates a generic widget according to an embodiment of the present disclosure.

Referring now to FIG. 3, FIG. 3 depicts an example video conferencing widget 300. The widget 300 include various components within a self-contained software widget that provide one or more functionalities described herein. This example widget 300 includes an application programing interface (API) 305 to enable interactions with a software application. For example, the widget 300 may receive input and send outputs to an application 310 via API 305, such as inputs to start a meeting, schedule a new meeting, view existing meeting recordings, begin a video conference chat, etc.

To enable video conferencing functionality, the widget 300 also includes a communications interface 315 to enable communications to the video conference provider. Widget 300 may receive input and send outputs to a video conference provider 320 via communications interface 315. For example, widget 300 may send a signal via communications interface 315 to video conference provider 320 to perform one or more video conference functions, including initiating a new meeting, scheduling a meeting, beginning a video conference chat, etc.

In addition to the two communication interfaces 305, 315, the widget 300 also includes one or more video conferencing modules 325*a*-325*n* to enable certain video conferencing functionality. Inputs received via the API 305 from a software application may initiate one or more of these modules to invoke the corresponding video conferencing functionality. Further, depending on the invoked functionality, one or more modules may interact to communicate with the video conference provider and perform the invoked functionality. For example, one module may be used to log a user into their account with the video conference provider, which may be invoked by a request to schedule a new video conference, such as by providing a previously received username and password. After the user is logged in, the module may then cause another module to receive information about the video conference to be scheduled and interact with the video conference provider to schedule the meeting. While the widget illustrated in FIG. 3 includes certain interfaces and modules, a variety of different types of functionality may be integrated into video conferencing widgets as will be discussed in more detail below.

The following FIGS. 4-8 and related discussion relates to video conference widgets. For ease of discussion, the following widgets are described with relation to a single application and video conference workflow scenario. It should be appreciated, however, that each of these widgets may be integrated and utilized individually or in combination with one or more widgets. Additionally, while the following are discussed with relation to a specific video conferencing action, it should be appreciated that additional widgets corresponding to other video conferencing actions not listed herein are contemplated.

Figure 4:
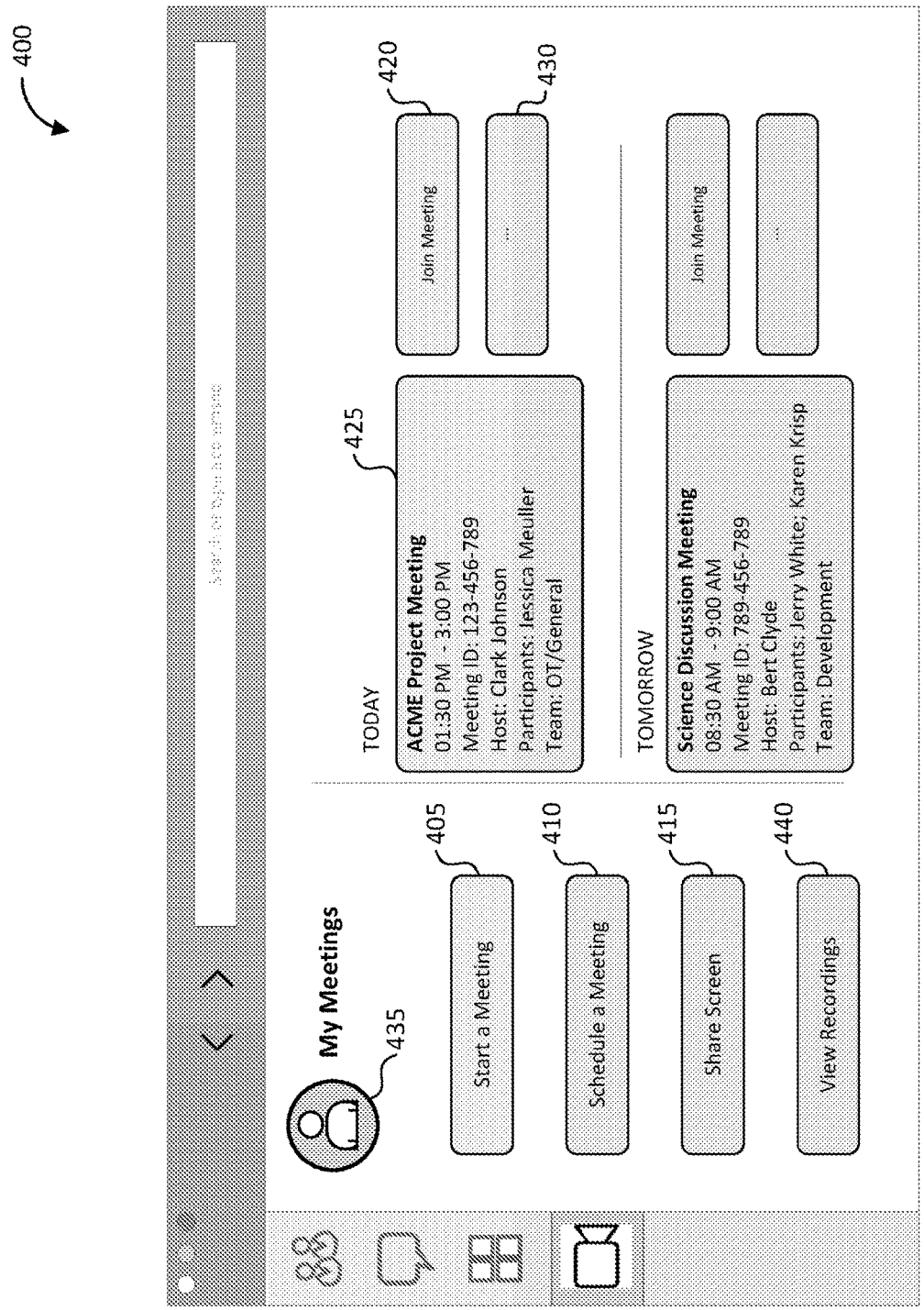
FIG. 4 illustrates an application employing various video conference widgets according to an embodiment of the present disclosure.

Referring now to FIG. 4, FIG. 4 depicts an organization's application 400 employing various video conference widgets. Application 400 may be a third party program or application implemented by the organization. For example, the organization may be a university and the application may be a learning management application. Because application 400 is a third party's program, editing or making programming adjustments to incorporate various features of a video conferencing workflow into the software code of application 400 may be difficult and time consuming. Even if application 400 is the organization's own program, incorporation of components of a video conferencing workflow into the application's software may be burdensome. To provide simple integration of one or more components of a video conferencing workflow into application 400, one or more video conference widgets may be implemented into application 400.

As shown, application 400 may include various video conference widgets. For example, application 400 may include a video conference start widget 405, a video conference scheduler widget 410, a share screen widget 415, a video conference join widget 420, a video conference listing widget 425, a video conference profile widget 435, and video conference recordings widget 440. Application 400 may also include a more options button 430. Upon selection of more options button 430, additional video conference widgets may be provided.

Each of these video conference widgets may define a plurality of video conferencing functions associated with functionality provided by a video conference provider. Upon selection of one or more of the above widgets, the respective widget may initiate a corresponding video conferencing function by communicating with the video conference provider. In one embodiment, the video conference widgets may be an iFrame (e.g., Inline Frame) of the video conference provider's experience. For example, upon selection of a video conference widget, one or more respective video conferencing functions may be invoked on a web page, and so portions of the web page may begin providing content from the video conference provider.

To invoke video conferencing functionality via the web page from the video conference provider, each video conference widget may include a software interface. The software interface may be a programming interface configured to receive input from, and provide output to, a software application, such as the organization's software application. The software application may be separate from the software of the video conference widget. The video conference widget may receive a command for a video conference function via the software interface and in response to the command, output via the software interface a signal to the video conference provider. The signal may cause the video conference widget to interact with the video conference provider to initiate the requested first video conference function. For example, a video conference start widget may receive a command to start a video conference. In response to receiving the command to start the video conference, the video conference widget may output a signal to the video conference provider to start a new video conference. Upon receipt of the signal from the widget, the video conference provider may start the video conference and send information back to the widget, which may then invoke a video conference client.

As noted above, each of the video conference widgets may define a plurality of video conferencing functions. As such, each of the video conference widgets may have predefined properties, such as a user interface, branding, and call-to-action buttons. For ease of integration, the code snippet for a video conference widget may be obtained from a central source with limited customization to the core logic, although basic modifications to the HTML components may be allowed.

Video Conference Start Widget

Returning now to FIG. 4, application 400 may include video conference start widget 405. Upon selection of video conference start widget 405, a user may initiate a meeting. Video conference start widget 405 may allow a user to start an ad-hoc meeting via a button. When the selection is received by video conference start widget 405, the software interface of video conference start widget 405 may output a signal to application 400 to interact with the video conference provider to start a meeting. The video conference provider may return a meeting ID back to the video conference start widget 405. The video conference start widget 405 may also subscribe to a webhook via the web page of the video conference provider. The webhook may provide notifications to the video conference start widget 405 when the meeting ends.

The user interface of video conference start widget 405 may change depending on the state of the video conference meeting. For example, when the meeting starts, the user interface of video conference start widget 405 may change states to convey that the meeting is in progress. For example, the user interface button for video conference start widget 405 may visually change. Similarly, when the meeting ends, the user interface button for video conference start widget 405 may change states again to indicate that the meeting has concluded. In some cases, the user interface button for video conference start widget 405 may return to the same state as prior to starting the meeting. The video conference start widget 405 may be notified that a meeting has ended via a webhook event.

Video Conference Scheduler Widget

Figure 5:
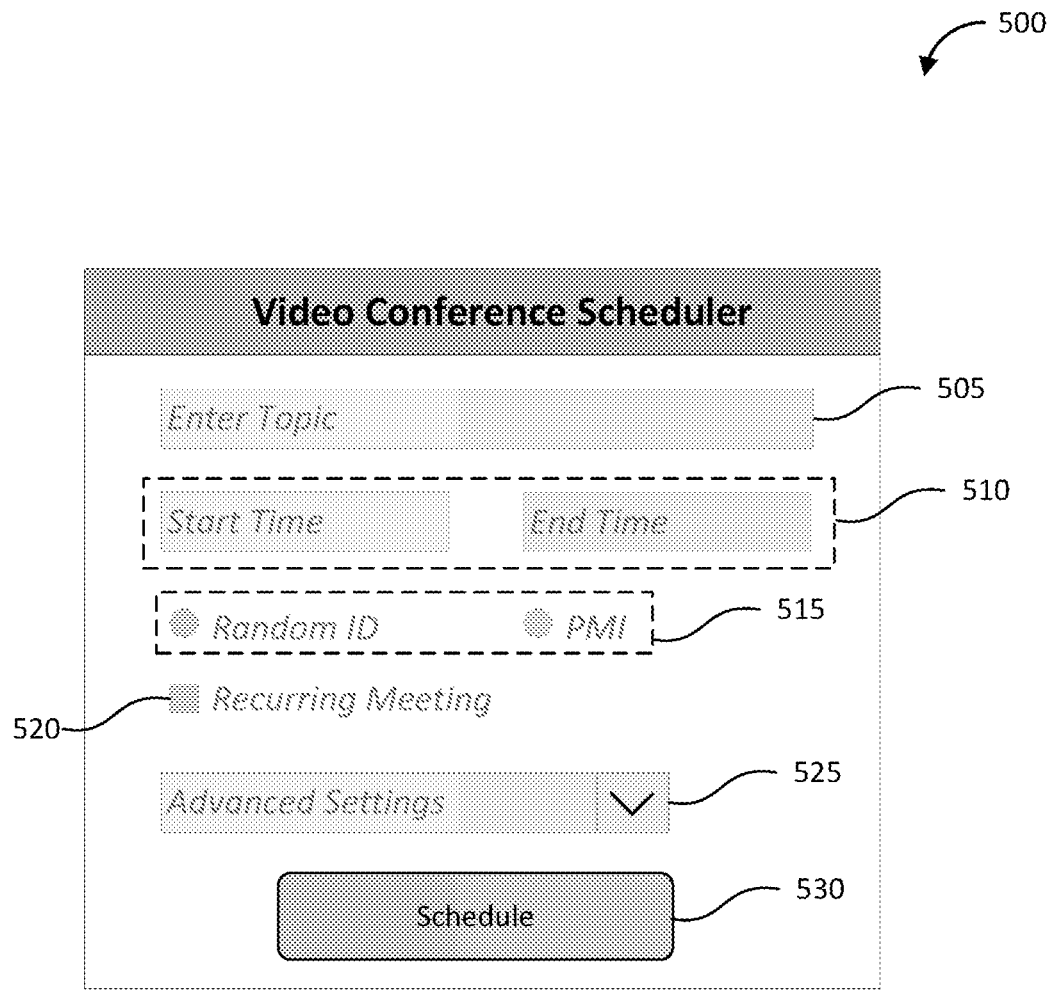
FIG. 5 illustrates an scheduler widget card according to an embodiment of the present disclosure.

FIG. 5 illustrates a scheduler widget card 500. Scheduler widget card 500 may be a user interface presented upon selection of video conference scheduler widget 410. As shown, scheduler widget card 500 may be a user interface that provides one or more input fields corresponding to the video conference being scheduled. For example, scheduler widget card 500 may provide input fields such as topic 505, meeting time 510, meeting ID 515, meeting type 520, and advanced settings 525.

Topic 505 may include a subject line for the meeting invitation to the video conference being scheduled. For example, topic 505 may provide the video conference a title and context for the subject matter to which the video conference will relate.

Meeting time 510 may include timing associated with the video conference. For example, meeting time 510 may include the date of the video conference being scheduled, a start time for the video conference, an end time for the video conference, and a duration for the video conference. The meeting time 510 can also include a time zone selection since video conferences often include participants across varying time zones.

Meeting ID 515 may include an option for the video conference provider to randomly generate a meeting identifier or for the video conference to use a personal meeting identifier (PMI). The personal meeting identifier may be a meeting identifier specific to the scheduler. As noted above, meeting ID 515 is distributed to the users invited to the video conference and can be used by the users to join the video conference. In some cases, the meeting ID 515 may include additional authentication requirements, such as a passcode.

Type of meeting 520 may correspond to the frequency or reoccurrence option for the video conference being scheduled. For example, type of meeting 520 may provide options such to select the video conference as a recurring meeting or a one-time meeting. If the video conference being schedule is a reoccurring meeting, then type of meeting 520 may provide selections for the frequency at which the meeting reoccurs. For example, reoccurrence options may include daily, weekly, monthly, yearly, and the like.

Scheduler widget card 500 may also include an advanced settings 525 option. Advanced settings 525 may include selections such as security options, meeting recording options, and participants. In some embodiments, one or more of these selections may be individually provided on scheduler widget card 500. In other embodiments, such as the illustrated example, these selections may be provided in a drop-down menu for user selection. Upon selection, a prompt may be provided to a user for input or selection of options pertaining to the selected option.

Security options may provide one or more security option for the video conference. For example, security options may include a passcode to join the meeting option, a waiting room for meeting invitees option, or an authenticated user requirement option. In cases where security options includes a passcode for joining the meeting, the input field for security options may include a prepopulated box with the passcode once the passcode for joining the meeting option is selected. As will be described in further detail below, the complexity of the passcode may be determined based on web settings. For example, upon selection of a passcode, the web setting for the complexity of the passcode may be retrieved and the passcode may be created according to the web setting.

Recording options can include option various options for recording the video conference. For example, recording option may include 'record meeting at start' or 'allow participant's to record the video conference.'

Scheduler widget card 500 may include an input field for entering the names or identities of users to invite to the video conference. In addition to participants, an option to select an alternative host may be provided. If an alternative host option is selected, a textbox in scheduler widget card 500 may include an input field into which an email address or other user identifier can be input for specifying which users can start and host a video conference on behalf of the scheduler.

In some cases, one or more settings relating to the above options for a video conference may be locked while other settings may be unlocked. Locked settings may be video conferencing settings that are not selectable or changeable at a scheduler level. For example, the security setting for a video conference may be locked to a high security setting or an encrypted setting. The locked settings may be determined by an organization administrator or the video conference provider.

Unlocked settings may be settings for a video conference that are selectable or changeable at a scheduler level. In some cases, unlocked settings may inherit their default value from the web portal. For example, meeting ID 515 may have a default setting of a random ID. As such, a random ID may be selected by default for the meeting ID 515 on scheduler widget card 500. The default values and settings for each of these options may be received from the web portal and populated in a respective field upon presentation of scheduler widget card 500. Any settings changed from its default state during scheduling may not write back to the video conference provider or carry forward to future meeting instances. Instead, a change from a default state or setting may be implemented only for the video conference in which the change is selected.

In some embodiments, a video conference may be scheduled on behalf of another user. In such embodiments, scheduler widget card 500 may include a carat drop down, or equivalent, to allow a scheduler to toggle between different users for scheduling purposes. To schedule a meeting on behalf of another user, the scheduler may need scheduling privileges. Scheduling privileges may be predefined on the video conference provider's web portal and/or on the application. For example, if the application is a calendar system, such as Google Calendar™, then the scheduling user may need authorization to schedule a meeting on behalf of another user.

If the scheduler has privileges to schedule on behalf of another user, the settings for the scheduled video conference may be pre-defined based on that user. For example, the video conference scheduler widget 410 may automatically pull meeting settings defined for the user via the web portal.

Once the input fields on scheduler widget card 500 are filled in, a user may select button 40530 to schedule the meeting. Upon scheduling the meeting, a confirmation page may be provided by video conference scheduler widget 410 with the details of the meeting. For example, the confirmation page may include the meeting topic, start time, end time, time zone, meeting ID, and an ICS (e.g., iCalendar) file. The ICS calendar file may allow the user to add an invite to the meeting to a calendar system. In some cases, the ICS file may be presented as an 'Add to Calendar' button.

Share Screen Widget

Returning now to FIG. 4, application 400 may include share screen widget 415. Upon selection of share screen widget 415, share screen widget 415 may interact with the video conference provider, by for example the web page, to share the screen presented to a user with another video conference user. Share screen widget 415 may allow a presenter to select an application window to be presented via the video conference provider to one or more other video conference users.

Video Conference Join Widget

Returning now to FIG. 4, application 400 may include a video conference join widget 420. Video conference join widget 420 may allow users to join an ongoing meeting based on the meeting ID. The meeting ID may be created from a video conference start widget 405, either on the joining user's application 400 or another user's application 400, and distributed to invited users. Using the meeting ID, video conference join widget 420 allows a user to join an ongoing video conference.

Figure 6:
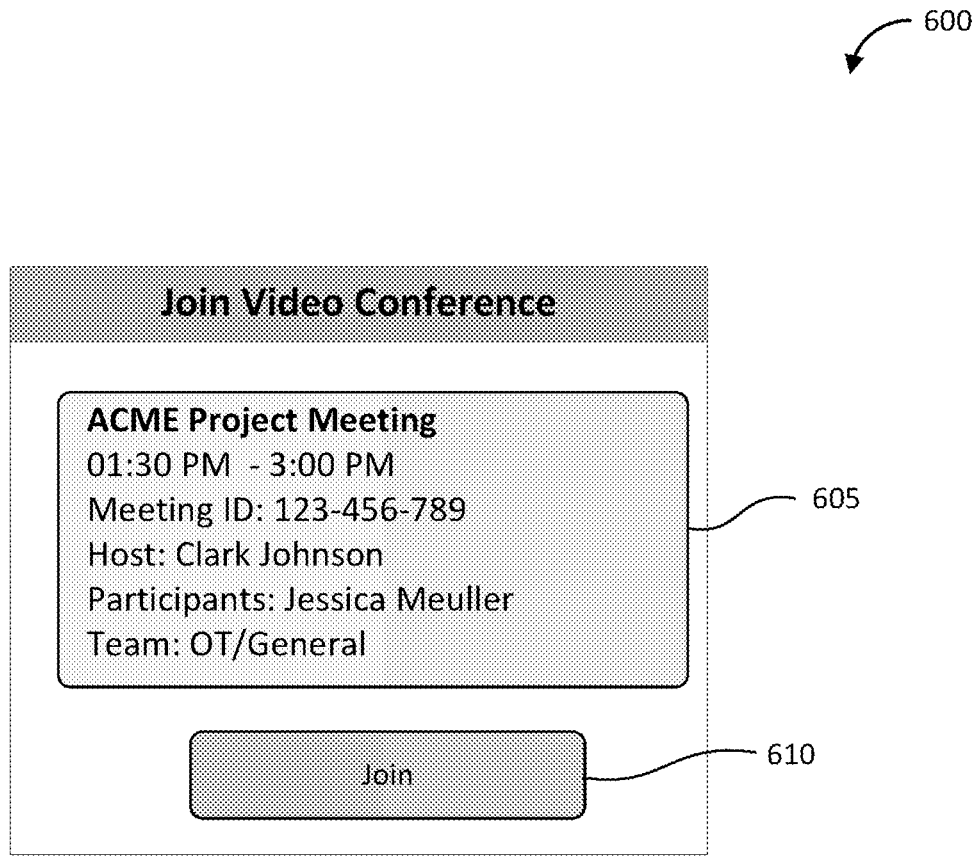
FIG. 6 illustrates an join widget card according to an embodiment of the present disclosure.

FIG. 6 illustrates a join widget card 600. Join widget card 600 may be a user interface presented upon selection of video conference join widget 420. As shown, join widget card 600 may be a user interface that presents one or more details 605 corresponding to the video conference being joined. For example, join widget card 600 may visually display details 605 for the joining video conference such as the meeting topic, meeting start and end times, meeting ID, host name, and names of participants. Details 605 may be populated based on the meeting ID. video conference join widget 420 may receive details 605 or meeting ID from the web page of the video conference provider. In some cases, video conference join widget 420 may receive the meeting ID, and related details 605, from video conference start widget 405.

Video Conference List Widget

Returning now to FIG. 4, application 400 may include a video conference list widget 425. video conference list widget 425 may allow users to view a listing of upcoming video conferences to which the user is invited. In some embodiments, the video conference list widget 425 may only provide a listing of video conferences that are hosted by the user. As shown on FIG. 4, video conference list widget 425 may provide details for each listed video conference. video conference list widget 425 may receive updates from the video conference provider regarding upcoming video conferences involving the user and display a listing of the upcoming meetings along with meeting details.

Video conference list widget 425 may categorize upcoming video conferences. For example, video conference list widget 425 may list one time meetings, recurring meetings with known time cadence, and recurring meetings with no fixed time. Video conference list widget 425 may also organize the upcoming video conferences in order of timing. For example, a meeting scheduled for today may be listed higher than a meeting scheduled for tomorrow. Once a video conference concludes, the meeting may be removed from the listing by video conference list widget 425.

Video Conference Profile Widget

Returning now to FIG. 4, application 400 may include video conference profile widget 435. Video conference profile widget 435 may provide information regarding a user, including context about the user's availability. Video conference profile widget 435 may be used to provide context about a user before initiating a video conference. For example, a first user may want to determine whether a second user is available for an ad-hoc meeting before sending a meeting invite. Thus, the first user can use video conference profile widget 435 to determine the availability of the second user.

Figure 7:
FIG. 7 illustrates an profile widget card according to an embodiment of the present disclosure.

FIG. 7 illustrates an profile widget card 700. Profile widget card 700 may be a user interface presented upon selection of video conference profile widget 435. Profile widget card 700 may present context information relating to a particular user. For example as shown, profile widget card 700 may include identification information 705, such as the user's name and position within the organization, a picture or image 710 of the user, and contact information 715 for the user. Contact information 715 may include the user's department, a phone number, email address, or any other relevant contact information. Identification information 705, image 710, and contact information 715 may be gathered from the video conference provider via the web portal or from application 400. In some cases, a user may input identification information 705, image 710, and contact information 715 when enabling video conference profile widget 435.

Profile widget card 700 may also include an availability tag 720. Availability tag 720 may be present as a banner, bubble, or any other means of visual display to indicate the availability of the user. Availability tag 720 may indicate the availability of the user. For example, availability tag 720 may indicate a presence state of the user, such as, in a meeting, in a calendar event, in a call, do not disturb, away, offline, mobile, or available.

In some embodiments, the user may select the status of availability tag 720. While in other embodiments, video conference profile widget 435 may automatically update a user's availability tag 720 based on contextual information. For example, video conference profile widget 435, upon selection, may communicate with the video conference provider to determine whether the user is in a video conference. If the user is in a meeting, video conference profile widget 435 may update availability tag 720 to 'in a meeting.' In some embodiments, video conference profile widget 435 may interact with application 400 to determine a user's availability. For example, application 400 may indicate to video conference profile widget 435 that the user is on a phone call and video conference profile widget 435 may update availability tag 720 to 'on a call' to reflect the user's presence status.

Profile widget card 700 may include one or more call-to-action buttons. For example, profile widget card 700 may include a schedule a meeting button 725 and a start a meeting button 730. While not shown, profile widget card 700 may include a call-to-action button for any video conference action contemplated herein. For example, profile widget card 700 may include a call-to-action button for viewing a listing of upcoming meetings for the user. Upon selection of schedule a meeting button 725, a video conference can be scheduled with the user. In some cases, the schedule a meeting button 725 may call or initiate video conference scheduler widget 410 to schedule a meeting. Start a meeting button 730 may start an ad-hoc meeting with the user. Start a meeting button 730 may call to initiate video conference start widget 405 to start an ad-hoc meeting.

Video Conference Recordings Widget

Figure 8:
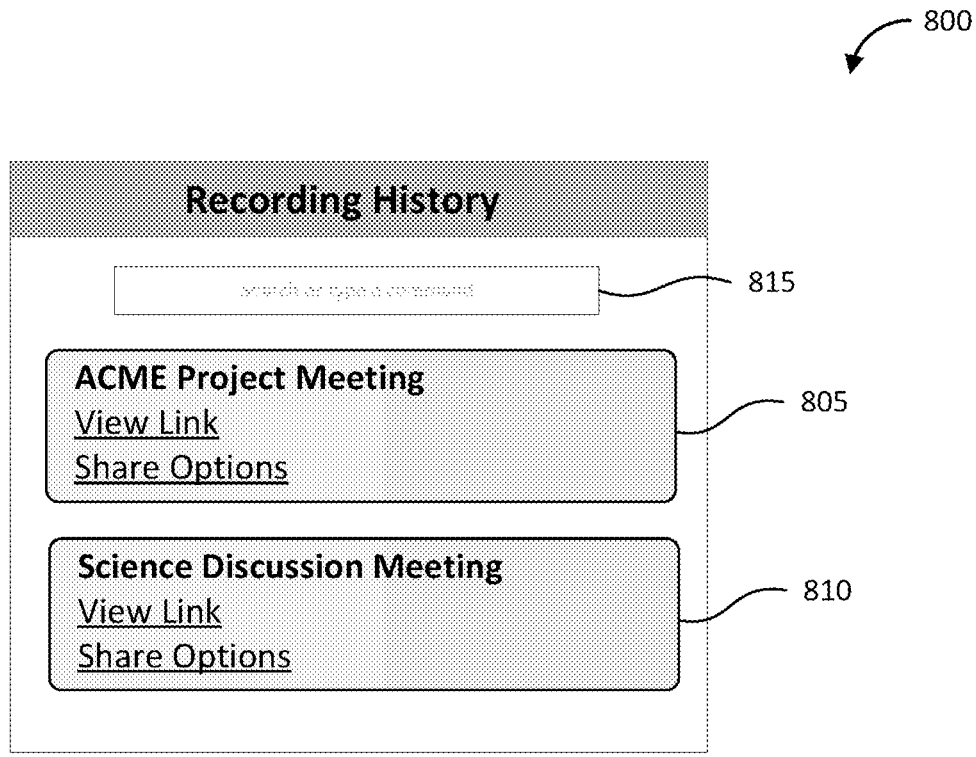
FIG. 8 illustrates an recordings widget card according to an embodiment of the present disclosure.

Returning now to FIG. 4, application 400 may include a video conference recordings widget 440. After a meeting concludes, if the meeting is recorded then a recording of that meeting may be saved as a cloud recording with the video conference provider. Video conference recordings widget 440 may provide a listing of a user's cloud recordings from previous video conferences. FIG. 8 illustrates an recordings widget card 800. Recordings widget card 800 may be a user interface presented upon selection of video conference recordings widget 440. Recordings widget card 800 may present a listing of a user's cloud recordings from previous video conferences involving the user. The listing of the recordings may be categorized or organized in a particular manner. In some embodiments, recordings widget card 800 may include a search bar 815. This may allow a user to search through its cloud recordings based on a key word, such as meeting topic.

As shown, recordings widget card 800 may include a plurality of recordings. A first recording 805 and a second recording 810. For each recording, details for the corresponding video conference may be provided. For example, as shown by first and second recordings 805 and 810, a name or topic of the meeting that was recorded is provided, a link to the cloud recording, and share options may be provided. Additional details, such as date and time that the meeting took place may also be presented on first and second recordings 805 and 810.

The link to the cloud recording and the share options may both be hyperlinks. Upon selection of the link to the cloud recording, the user may be redirected to view the cloud recording on the video conference provider's web portal. Upon selection of the share options, the user may be prompted with various share options such as a share link for the user to copy and send to other contacts. Share permission may be inherited from web settings of a respective recording. The share permissions may be set on the web portal of the video conference provider.

One or more of the above video conference widgets may be part of a widget library. The widget library may be located in cloud-based storage or otherwise stored with the video conference provider. The widget library may store a variety of video conference widgets. One or more video conference widgets may be retrieved from the widget library and integrated into an organization's application based on techniques disclosed herein. For example, the widget library may be synced to an organization's application and the organization may retrieve a first video conference widget and a second video conference widget. The first and second video conference widgets may be integrated into the application's software. The first and second video conference widgets may be any of the video conference widgets described herein and perform the respective functions.

Figure 9:
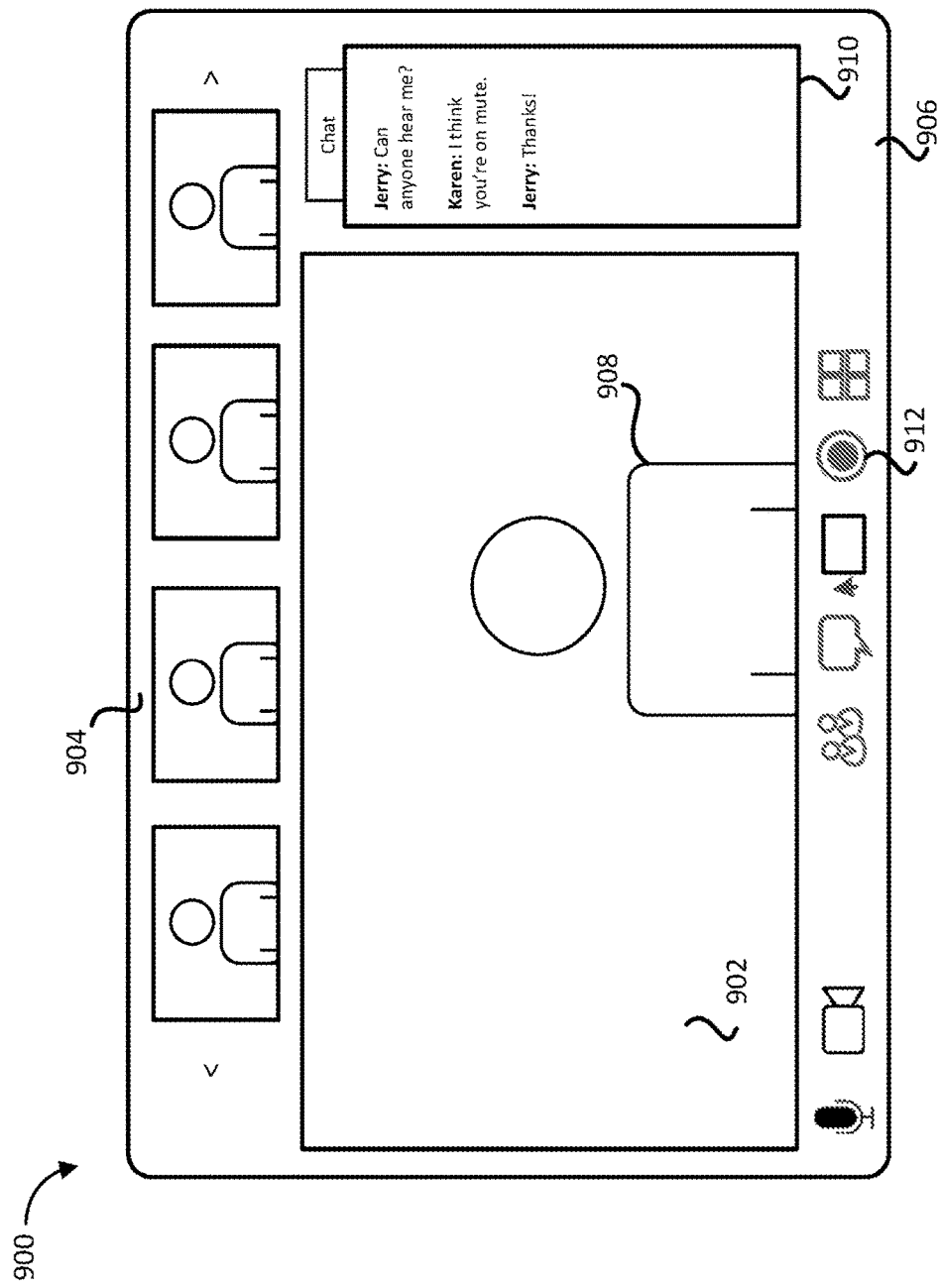
FIG. 9 shows an example graphical user interface (GUI) for a video conference according to an embodiment of the present disclosure.

Referring now to FIG. 9, FIG. 9 shows an example graphical user interface (GUI) 900 for a video conference such as an video conferences as described herein. GUI 900 of FIG. 9 will be described with respect to any suitable system according to this disclosure that may be employed, including any of the systems shown in FIGS. 1-2.

In some embodiments, a GUI 900 is viewable to a user or participant of the video conference on the participant's device, for example the client devices 220-230, 250. Presentation of the GUI 900 on the participant's device may be in response to the initiation of the video conference. For example, if a user joins a meeting by selecting video conference join widget 420 or initiates an ad-hoc meeting by selecting video conference start widget 405. Upon initiation of the meeting, whether scheduled or ad-hoc, GUI 900 may be presented to the user via the web page of the video conference provider.

The GUI 900 may include a roster 904 of a plurality of participants of the video conference. The roster 904 may include a video stream of the plurality of participants. In other embodiments, the roster 904 may include a picture, image, representation, or a listing of the plurality of participants. When a participant joins the video conference, the joining participant is added to the roster 904. The meeting roster 904 provides an indication of the one or more participants of the video conference. For example, the meeting roster 904 may provide the identity of each participant of a plurality of participants. The meeting roster 904 may be a listing of the identity (e.g., name) of the participants or the meeting roster 904 may provide an image or video stream of the participant.

During the video conference, participants of the video conference send and receive video and audio streams. If the video conference is encrypted, then the video and audio streams received may be encrypted streams. Each participant may receive a meeting key which, as discussed above, allows access for the participants to the streams of video and audio from the video conference.

As illustrated, GUI 900 includes a dashboard 906 containing one or more action selections. For example, dashboard 906 includes a recording selection 912912 that allows a participant to record the streams of audio and video during the video conference. Any recordings from the meeting may be stored as a cloud recording with the video conference provider. GUI 900 may also include a chat box 910 which allows participants of the video conference to message one another during a video conference.

Figure 10:
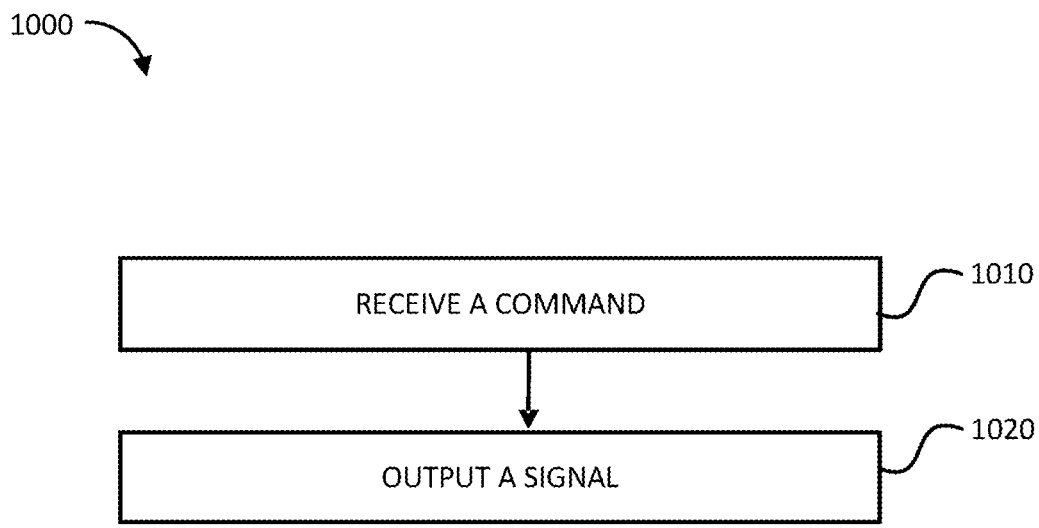
FIG. 10 shows an example method for utilizing a video conference widget according to an embodiment of the present disclosure.

Referring now to FIG. 10, FIG. 10 shows an example method 1000 for utilizing a video conference widget. The method 1000 of FIG. 10 will be described with respect to the systems shown in FIGS. 3-8; however any suitable system according to this disclosure may be employed, including any of the systems shown in FIGS. 1-2.

At block 1010, a video conference widget may receive a command via a programming interface for the video conference widget. The video conference widget may be a self-contained software module having program code defining a plurality of video conference modules (e.g., functions) associated with functionality provided by a video conference provider and a software interface. The software interface may be a programming interface that is configured to receive input from, and provide out to, a software application that is separate from the video conference widget. For example, the software application may be a third party application or an organization's application or program.

The command received by the video conference widget via the programming interface may be command for a first video conference function from the plurality of video conferencing functions. As noted above, the video conference widget may be a specific video conference widget containing software for specific video conferencing functionality. For example, in some embodiments, the video conference widget may be video conference start widget 405 and the plurality of video conferencing functions may include one or more video conferencing functions for starting a video conference. In such examples, method 1000 may include receiving, by video conference start widget 405 from the software application via the programming interface, a command to start a video conference from the software application.

In some embodiments, the video conference widget may be video conference scheduler widget 410 and the plurality of video conferencing functions may include one or more video conferencing functions for scheduling a video conference. In such examples, method 1000 may include receiving, by video conference scheduler widget 410 from the software application via the programming interface, a command to schedule a video conference from the software application.

In some embodiments, the video conference widget may be video conference join widget 420 and the plurality of video conferencing functions may include one or more video conferencing functions for joining a video conference. In such examples, method 1000 may include receiving, by video conference join widget 420 from the software application via the programming interface, a command to join a video conference from the software application.

In some embodiments, the video conference widget may be video conference list widget 425 and the plurality of video conferencing functions may include one or more video conferencing functions for providing a meeting list for one or more upcoming video conferences. In such examples, method 1000 may include receiving, by video conference list widget 425 from the software application via the programming interface, a command requesting a meeting list for one or more upcoming video conferences from the software application.

In some embodiments, the video conference widget may be video conference profile widget 435 and the plurality of video conferencing functions may include one or more video conferencing functions for providing contextual information for a user of a video conference. In such examples, method 1000 may include receiving, by video conference profile widget 435 from the software application via the programming interface, a command requesting contextual information for the user from the software application.

In some embodiments, the video conference widget may be video conference recordings widget 440 and the plurality of video conferencing functions may include one or more video conferencing functions for providing a recording of a video conference. In such examples, method 1000 may include receiving, by video conference recordings widget 440 from the software application via the programming interface, a command requesting a recording a video conference from the software application.

In response to the command, the video conference widget may output a signal at block 1020. The video conference widget may output the signal to the video conference provider. The signal may be configured to cause the video conference widget to interact with the video conference provider to perform the first video conference function. In some embodiments, the video conference provider may perform the first video conference function upon interacting with the video conference widget.

Continuing the above embodiments relating to specific video conference widgets, in the embodiments where the video conference widget is video conference start widget 405, then video conference start widget 405 may output a signal in response to the command. Video conference start widget 405 may output the signal to the video conference provider. The signal may be configured to cause video conference start widget 405 to interact with the video conference provider to start the video conference and provide at least one video or audio stream from the video conference to the software application.

In the embodiments where the video conference widget is video conference scheduler widget 410, then video conference scheduler widget 410 may output a signal in response to the command. Video conference scheduler widget 410 may output the signal to the video conference provider. The signal may be configured to cause video conference scheduler widget 410 to interact with the video conference provider to schedule the video conference and provide at least a meeting key and a meeting identifier from the video conference to the software application.

In the embodiments where the video conference widget is video conference join widget 420, then video conference join widget 420 may output a signal in response to the command. Video conference join widget 420 may output the signal to the video conference provider. The signal may be configured to cause video conference join widget 420 to interact with the video conference provider to join the video conference and provide at least one video or audio stream from the video conference to the software application.

In the embodiments where the video conference widget is video conference list widget 425, then video conference list widget 425 may output a signal in response to the command. Video conference list widget 425 may output the signal to the video conference provider. The signal may be configured to cause video conference list widget 425 to interact with the video conference provider to request the meeting list for the video conference from the video conference and provide the meeting list for the one or more upcoming video conferences from the video conference to the software application.

In the embodiments where the video conference widget is video conference profile widget 435, then video conference profile widget 435 may output a signal in response to the command. Video conference profile widget 435 may output the signal to the video conference provider. The signal may be configured to cause video conference profile widget 435 to interact with the video conference provider and the software application to request contextual information for the user and provide the contextual information to the software application.

In the embodiments where the video conference widget is video conference recordings widget 440, then video conference recordings widget 440 may output a signal in response to the command. Video conference recordings widget 440 may output the signal to the video conference provider. The signal may be configured to cause video conference recordings widget 440 to interact with the video conference provider to request the recording of the video conference from the video conference and provide the recording of the video conference to the software application.

It should be appreciated that the method 1000 described above is only one example according to this disclosure. In other examples, the blocks described above may be performed in a different order or one or more blocks may be omitted. For example, the order of blocks 1010-1020 may occur in any suitable order according to different examples.

Figure 11:
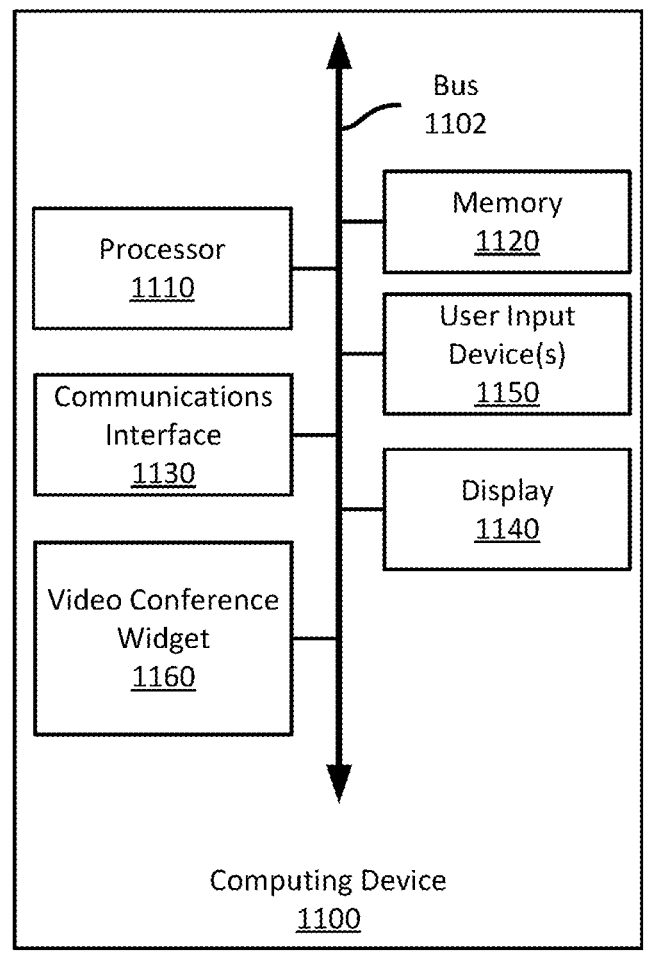
FIG. 11 shows an example computing device suitable for use with any system or method for utilizing a video conference widget according to this disclosure.

Referring now to FIG. 11, FIG. 11 shows an example computing device 1100 suitable for use in example systems or methods for suggesting user actions during a video conference according to this disclosure. The example computing device 1100 includes a processor 1110 which is in communication with the memory 1120 and other components of the computing device 1100 using one or more communications buses 1102. The processor 1110 is configured to execute processor-executable instructions stored in the memory 1120 to execute a video conference widget 1160 according to this disclosure or to perform one or more methods or techniques for enabling a video conference widget to interact with a video conference provider to perform one or more video conference functions according to different examples, such as part or all of the example widgets and methods described above with respect to FIGS. 3-9. As discussed above, video conference widget 1160, when executed by processor 1110, may interact with a software application to provide one or more video conference functionalities as described herein.

The computing device, in this example, also includes one or more user input devices 1150, such as a keyboard, mouse, touchscreen, video capture device, microphone, etc., to accept user input. The computing device 1100 also includes a display 1140 to provide visual output to a user.

The computing device 1100 also includes a communications interface, such as display 1140. In some examples, the communications interface 1130 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a computer-readable medium comprising a video conference widget configured to be executed by a processor, the video conference widget comprising a self-contained software module that is configured to: define a plurality of video conferencing functions associated with functionality provided by a video conference provider; provide a software interface for the video conference widget, the software interface being a programming interface configured to receive input from, and provide output to, a software application that is separate from the video conference widget; receive, via the software interface from the software application, a command for a first video conference function of the plurality of video conferencing functions; and in response to the command, output via the software interface, a signal, the signal configured to cause the video conference widget to interact with the video conference provider to perform the first video conference function.

Example 2 is the computer-readable medium of any previous or subsequent example, further comprising a widget library, the widget library comprising the video conference widget.

Example 3 is the computer-readable medium of any previous or subsequent example, wherein: the video conference widget is a first video conference widget; and the widget library comprises a second video conference widget comprising a second self-contained software module that is configured to: define a second plurality of video conferencing functions associated with functionality provided by the video conference provider; provide a second software interface for the second video conference widget, the second software interface being a programming interface configured to receive input from, and provide output to, the software application that is separate from the second video conference widget; receive, via the software interface from the software application, a second command for a second video conference function of the plurality of video conference function; and in response to the second command, output via the second software interface a second signal, the second signal configured to cause the video conference widget to interact with the video conference provider to perform the second video conference function.

Example 4 is the computer-readable medium of any previous or subsequent example, wherein the video conference widget is a video conference join widget and wherein: the plurality of video conferencing functions comprises one or more video conferencing functions for joining a video conference; receive, via the software interface, a command to join a video conference from the software application; and in response to the command, interact with the video conference provider to join the video conference and provide at least one video or audio stream from the video conference to the software application.

Example 5 is the computer-readable medium of any previous or subsequent example, wherein the video conference widget is a video conference scheduler widget and wherein: the plurality of video conferencing functions comprises one or more video conferencing functions for scheduling a video conference; receive, via the software interface, a command to schedule a video conference from the software application; and in response to the command, interact with the video conference provider to schedule the video conference and provide at least a meeting key and a meeting identifier from the video conference to the software application.

Example 6 is the computer-readable medium of any previous or subsequent example, wherein the video conference widget is further configured to: in response to the command, transmit, via the software interface to the software application, a request for meeting information for the video conference being scheduled, the meeting information comprising at least one of: a date; a time; a duration for the video conference; number of participants; names of one or more participants; and a type of encryption for the video conference; receive, via the software interface from the software application, an input comprising the meeting information; and in response to the input, interact with the video conference provider to provide the meeting information to the video conference provider.

Example 7 is the computer-readable medium of any previous or subsequent example, wherein the video conference widget is a video conference start widget and wherein: the plurality of video conferencing functions comprises one or more video conferencing functions for starting a video conference; receive, via the software interface, a command to start a video conference from the software application; and in response to the command, interact with the video conference provider to start the video conference and provide at least one video or audio stream from the video conference to the software application.

Example 8 is the computer-readable medium of any previous or subsequent example, wherein the video conference widget is a video conference list widget and wherein: the plurality of video conferencing functions comprises one or more video conferencing functions for providing a meeting list for one or more upcoming video conferences; receive, via the software interface, a command requesting a meeting list for one or more upcoming video conferences from the software application; and in response to the command, interact with the video conference provider to request the meeting list for the video conference from the video conference and provide the meeting list for the one or more upcoming video conferences from the video conference to the software application.

Example 9 is the computer-readable medium of any previous or subsequent example, wherein the video conference widget is a video conference profile widget and wherein: the plurality of video conferencing functions comprises one or more video conferencing functions for providing contextual information for a user of a video conference; receive, via the software interface, a command requesting contextual information for the user from the software application; and in response to the command, interact with the video conference provider and the software application to request contextual information for the user and provide the contextual information to the software application.

Example 10 is the computer-readable medium of any previous or subsequent example, wherein the video conference widget is a video conference recordings widget and wherein: the plurality of video conferencing functions comprises one or more video conferencing functions for providing a recording of a video conference; receive, via the software interface, a command requesting a recording a video conference from the software application; and in response to the command, interact with the video conference provider to request the recording of the video conference from the video conference and provide the recording of the video conference to the software application.

Example 11 is a system comprising: a non-transitory computer-readable medium; and a processor communicatively coupled to the non-transitory computer-readable medium, the processor configured to execute processor-executable instructions stored in the non-transitory computer-readable medium to: transmit, by a software application, to a video conference widget that is a self-contained software module, a command, wherein: the video conference widget comprising program code defining a plurality of video conferencing functions associated with functionality provided by a video conference provider and a software interface, the software interface being a programming interface that is configured to receive input from, and provide output to the software application that is separate from the video conference widget; the command is transmitted to the software interface of the video conference widget; and the command is for a first video conference function, the command configured to cause the video conference widget to output a signal, the signal configured to cause the video conference widget to interact with the video conference provider to perform the first video conference function.

Example 12 is the system of any previous or subsequent example, further comprising a widget library, the widget library comprising the video conference widget and wherein: the widget library comprises the video conference widget and a second video conference widget; the processor is configured to execute further processor-executable instructions stored in the non-transitory computer-readable medium to: transmit, by the software application, to the second video conference widget that is a self-contained software module, a second command, wherein: the second video conference widget comprise program code defining a second plurality of video conferencing functions associated with functionality provided by the video conference provider and a second software interface, the second software interface being a second programming interface that is configured to receive input from, and provide out to, the software application that is separate from the second video conference widget; the second command is transmitted to the second software interface of the second video conference widget; and the second command is for a second video conference function, the second command configured to cause the second video conference widget to output a second signal, the second signal configured to cause the video conference widget to interact with the video conference provider to perform the second video conference function.

Example 13 is the system of any previous or subsequent example, wherein: the video conference widget is a video conference join widget and the plurality of video conferencing functions comprises one or more video conferencing functions for joining a video conference; and the processor is configured to execute further processor-executable instructions stored in the non-transitory computer-readable medium to: transmit, via the software interface to the video conference join widget, a command to join a video conference from the software application, wherein in response to the command, the video conference join widget interacts with the video conference provider to join the video conference and provides at least one video or audio stream from the video conference to the software application.

Example 14 is the system of any previous or subsequent example, wherein: the video conference widget is a video conference scheduler widget and the plurality of video conferencing functions comprises one or more video conferencing functions for scheduling a video conference; and the processor is configured to execute further processor-executable instructions stored in the non-transitory computer-readable medium to: transmit, via the software interface to the video conference scheduler widget, a command to schedule a video conference from the software application, wherein in response to the command, the video conference scheduler widget interacts with the video conference provider to schedule the video conference and provides at least a meeting key and a meeting identifier from the video conference to the software application.

Example 15 is the system of any previous or subsequent example, wherein the processor is configured to execute further processor-executable instructions stored in the non-transitory computer-readable medium to: in response to the command, receive, via the software interface to the software application, a request to display a schedule widget card, the schedule widget card comprising input fields requesting for meeting information for the video conference being scheduled, the meeting information comprising at least one of: a date; a time; a duration for the video conference; number of participants; names of one or more participants; and a type of encryption for the video conference; and transmit, via the software interface from the software application, an input comprising the meeting information to the video conference scheduler widget, wherein the video conference scheduler widget in response to the input, interacts with the video conference provider to provide the meeting information to the video conference provider.

Example 16 is the system of any previous or subsequent example, wherein: the video conference widget is a video conference start widget and the plurality of video conferencing functions comprises one or more video conferencing functions for starting a video conference; and the processor is configured to execute further processor-executable instructions stored in the non-transitory computer-readable medium to: transmit, via the software interface to the video conference start widget, a command to start a video conference from the software application, wherein in response to the command, the video conference start widget interacts with the video conference provider to start the video conference and provides at least one video or audio stream from the video conference to the software application.

Example 17 is the system of any previous or subsequent example, wherein: the video conference widget is a video conference list widget and the plurality of video conferencing functions comprises one or more video conferencing functions for providing a meeting list for one or more upcoming video conferences; and the processor is configured to execute further processor-executable instructions stored in the non-transitory computer-readable medium to: transmit, via the software interface to the video conference start widget, a command requesting a meeting list for one or more upcoming video conferences from the software application, wherein in response to the command, the video conference list widget interacts with the video conference provide the meeting list for the one or more upcoming video conferences from the video conference to the software application.

Example 18 is the system of any previous or subsequent example, wherein: the video conference widget is a video conference profile widget and the plurality of video conferencing functions comprises one or more video conferencing functions for providing contextual information for a user of a video conference; and the processor is configured to execute further processor-executable instructions stored in the non-transitory computer-readable medium to: transmit, via the software interface to the video conference start widget, a command requesting contextual information for the user from the software application, wherein in response to the command, the video conference profile widget interacts with the video conference provider and the software application to request contextual information for the user and provide the contextual information to the software application.

Example 19 is the system of any previous or subsequent example, wherein: the video conference widget is a video conference recordings widget and the plurality of video conferencing functions comprises one or more video conferencing functions for providing a recording of a video conference; and the processor is configured to execute further processor-executable instructions stored in the non-transitory computer-readable medium to: transmit, via the software interface to the video conference start widget, a command requesting a recording a video conference from the software application, wherein in response to the command, the video conference recordings widget interacts with the video conference provider to request the recording of the video conference from the video conference and provide the recording of the video conference to the software application.

Example 20 is a method comprising: receiving, by a video conference widget, a command via a programming interface for the video conference widget, wherein: the video conference widget is a self-contained software module comprising program code defining a plurality of video conferencing functions associated with functionality provided by a video conference provider and a software interface, the software interface being a programming interface that is configured to receive input from, and provide output to, a software application that is separate from the video conference widget; and the command is for a first video conference function of the plurality of video conferencing functions; and outputting in response to the command, by the video conference widget, a signal configured to cause the video conference widget to interact with the video conference provider to perform the first video conference function.

Example 21 is the method of any previous or subsequent example, wherein the video conference widget is a video conference join widget and the plurality of video conferencing functions comprises one or more video conferencing functions for joining a video conference, and the method further comprises: receiving, by the video conference join widget from the software application via the programming interface, a command to join a video conference from the software application; and outputting in response to the command, by the video conference join widget to the software application via the programming interface, a signal configured to cause the video conference join widget to interact with the video conference provider to join the video conference and provide at least one video or audio stream from the video conference to the software application.

Example 22 is the method of any previous or subsequent example, wherein the video conference widget is a video conference scheduler widget and the plurality of video conferencing functions comprises one or more video conferencing functions for scheduling a video conference, and the method further comprises: receiving, by the video conference scheduler widget from the software application via the programming interface, a command to schedule a video conference from the software application; and outputting in response to the command, by the video conference scheduler widget to the software application via the programming interface, a signal configured to cause the video conference scheduler widget to interact with the video conference provider to schedule the video conference and provide at least a meeting key and a meeting identifier from the video conference to the software application.

Example 23 is the method of any previous or subsequent example, wherein the video conference widget is a video conference start widget and the plurality of video conferencing functions comprises one or more video conferencing functions for starting a video conference, and the method further comprises: receiving, by the video conference start widget from the software application via the programming interface, a command to start a video conference from the software application; and outputting in response to the command, by the video conference start widget to the software application via the programming interface, a signal configured to cause the video conference start widget to interact with the video conference provider to start the video conference and provide at least one video or audio stream from the video conference to the software application.

Example 24 is the method of any previous or subsequent example, wherein the video conference widget is a video conference list widget and the plurality of video conferencing functions comprises one or more video conferencing functions for providing a meeting list for one or more upcoming video conferences, and the method further comprises: receiving, by the video conference list widget from the software application via the programming interface, a command requesting a meeting list for one or more upcoming video conferences from the software application; and 25. outputting in response to the command, by the video conference list widget to the software application via the programming interface, a signal configured to cause the video conference list widget to interact with the video conference provider to request the meeting list for the video conference from the video conference and provide the meeting list for the one or more upcoming video conferences from the video conference to the software application.

The foregoing description of some examples has been presented only for the purpose of example and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A non-transitory computer-readable medium comprising a video conference widget configured to be executed by a processor, the video conference widget comprising a self-contained software module that is configured to:
   receive, via a software interface from a software application, a command for a first video conference function, wherein the self-contained software module comprises a plurality of video conferencing functions associated with functionality provided by a video conference provider; and
   in response to the command, output a signal, the signal configured to cause the video conference widget to interact with the video conference provider to perform the first video conference function.

2. The non-transitory computer-readable medium of claim 1, wherein the video conference widget is a video conference join widget and wherein:
   the plurality of video conferencing functions comprises one or more video conferencing functions for joining a video conference;
   receive, via the software interface, a command to join a video conference from the software application; and
   in response to the command, interact with the video conference provider to join the video conference and provide at least one video or audio stream from the video conference to the software application.

3. The non-transitory computer-readable medium of claim 1, wherein the video conference widget is a video conference scheduler widget and wherein:
   the plurality of video conferencing functions comprises one or more video conferencing functions for scheduling a video conference;
   receive, via the software interface, a command to schedule a video conference from the software application; and
   in response to the command, interact with the video conference provider to schedule the video conference and provide at least a meeting key and a meeting identifier from the video conference to the software application.

4. The non-transitory computer-readable medium of claim 1, wherein the video conference widget is a video conference start widget and wherein:
   the plurality of video conferencing functions comprises one or more video conferencing functions for starting a video conference;
   receive, via the software interface, a command to start a video conference from the software application; and
   in response to the command, interact with the video conference provider to start the video conference and provide at least one video or audio stream from the video conference to the software application.

5. The non-transitory computer-readable medium of claim 1, wherein the video conference widget is a video conference list widget and wherein:
   the plurality of video conferencing functions comprises one or more video conferencing functions for providing a meeting list for one or more upcoming video conferences;
   receive, via the software interface, a command requesting a meeting list for one or more upcoming video conferences from the software application; and
   in response to the command, interact with the video conference provider to request one or more meeting lists for the one or more upcoming video conferences from the video conference provider and provide the one or more meeting lists for the one or more upcoming video conferences from the video conference to the software application.

6. The non-transitory computer-readable medium of claim 1, wherein the video conference widget is a video conference profile widget and wherein:
   the plurality of video conferencing functions comprises one or more video conferencing functions for providing contextual information for a user of a video conference;
   receive, via the software interface, a command requesting contextual information for the user from the software application; and
   in response to the command, interact with the video conference provider and the software application to request contextual information for the user and provide the contextual information to the software application.

7. A system comprising:
   a non-transitory computer-readable medium; and
   a processor communicatively coupled to the non-transitory computer-readable medium, the processor configured to execute processor-executable instructions stored in the non-transitory computer-readable medium to:
- transmit, by a software application, to a video conference widget that is a self-contained software module, a command, wherein:
- the video conference widget comprises program code defining a plurality of video conferencing functions associated with functionality provided by a video conference provider; and
- the command is for a first video conference function, the command configured to cause the video conference widget to output a signal, the signal configured to cause the video conference widget to interact with the video conference provider to perform the first video conference function.

8. The system of claim 7, further comprising a widget library, the widget library comprising the video conference widget and wherein:
- the widget library comprises the video conference widget and a second video conference widget;
- the processor is configured to execute further processor-executable instructions stored in the non-transitory computer-readable medium to:
  - transmit, by the software application, to the second video conference widget that is a self-contained software module, a second command, wherein:
  - the second video conference widget comprise program code defining a second plurality of video conferencing functions associated with functionality provided by the video conference provider; and
  - the second command is for a second video conference function, the second command configured to cause the second video conference widget to output a second signal, the second signal configured to cause the video conference widget to interact with the video conference provider to perform the second video conference function.

9. The system of claim 7, wherein:
- the video conference widget is a video conference join widget and the plurality of video conferencing functions comprises one or more video conferencing functions for joining a video conference; and
- the processor is configured to execute further processor-executable instructions stored in the non-transitory computer-readable medium to:
  - transmit, to the video conference join widget, a command to join a video conference from the software application, wherein in response to the command, the video conference join widget interacts with the video conference provider to join the video conference and provides at least one video or audio stream from the video conference to the software application.

10. The system of claim 7, wherein:
- the video conference widget is a video conference scheduler widget and the plurality of video conferencing functions comprises one or more video conferencing functions for scheduling a video conference; and
- the processor is configured to execute further processor-executable instructions stored in the non-transitory computer-readable medium to:
  - transmit, to the video conference scheduler widget, a command to schedule a video conference from the software application, wherein in response to the command, the video conference scheduler widget interacts with the video conference provider to schedule the video conference and provides at least a meeting key and a meeting identifier from the video conference to the software application.

11. The system of claim 10, wherein the processor is configured to execute further processor-executable instructions stored in the non-transitory computer-readable medium to:
- in response to the command, receive a request to display a schedule widget card, the schedule widget card comprising input fields requesting for meeting information for the video conference being scheduled, the meeting information comprising at least one of:
  - a date;
  - a time;
  - a duration for the video conference;
  - number of participants;
  - names of one or more participants; and
  - a type of encryption for the video conference; and
- transmit, to the video conference scheduler widget, an input comprising the meeting information, wherein the video conference scheduler widget in response to the input, interacts with the video conference provider to provide the meeting information to the video conference provider.

12. The system of claim 7, wherein:
- the video conference widget is a video conference start widget and the plurality of video conferencing functions comprises one or more video conferencing functions for starting a video conference; and
- the processor is configured to execute further processor-executable instructions stored in the non-transitory computer-readable medium to:
  - transmit, to the video conference start widget, a command to start a video conference, wherein in response to the command, the video conference start widget interacts with the video conference provider to start the video conference and provides at least one video or audio stream from the video conference to the software application.

13. The system of claim 7, wherein:
- the video conference widget is a video conference profile widget and the plurality of video conferencing functions comprises one or more video conferencing functions for providing contextual information for a user of a video conference; and
- the processor is configured to execute further processor-executable instructions stored in the non-transitory computer-readable medium to:
  - transmit, to the video conference start widget, a command requesting contextual information for the user from the software application, wherein in response to the command, the video conference profile widget interacts with the video conference provider and the software application to request contextual information for the user and provide the contextual information to the software application.

14. The system of claim 7, wherein:
- the video conference widget is a video conference recordings widget and the plurality of video conferencing functions comprises one or more video conferencing functions for providing a recording of a video conference; and
- the processor is configured to execute further processor-executable instructions stored in the non-transitory computer-readable medium to:
  - transmit, to the video conference start widget, a command requesting a recording a video conference from the software application, wherein in response to the command, the video conference recordings widget interacts with the video conference provider to request the recording of the video conference from the video conference and provide the recording of the video conference to the software application.

15. A method comprising:
receiving, by a video conference widget, a command for the video conference widget to perform a function, wherein:
  the video conference widget is a self-contained software module comprising program code defining a plurality of video conferencing functions associated with functionality provided by a video conference provider; and
  the command is for a first video conference function of the plurality of video conferencing functions; and
outputting in response to the command, by the video conference widget, a signal configured to cause the video conference widget to interact with the video conference provider to perform the first video conference function.

16. The method of claim 15, wherein the video conference widget is a video conference join widget and the plurality of video conferencing functions comprises one or more video conferencing functions for joining a video conference, and the method further comprises:
  receiving, by the video conference join widget, a command to join a video conference; and
  outputting in response to the command, by the video conference join widget, a signal configured to cause the video conference join widget to interact with the video conference provider to join the video conference and provide at least one video or audio stream from the video conference to a software application associated with the video conference join widget.

17. The method of claim 15, wherein the video conference widget is a video conference scheduler widget and the plurality of video conferencing functions comprises one or more video conferencing functions for scheduling a video conference, and the method further comprises:
  receiving, by the video conference scheduler widget, a command to schedule a video conference; and
  outputting in response to the command, by the video conference scheduler widget, a signal configured to cause the video conference scheduler widget to interact with the video conference provider to schedule the video conference and provide at least a meeting key and a meeting identifier from the video conference to a software application associated with the video conference scheduler widget.

18. The method of claim 15, wherein the video conference widget is a video conference start widget and the plurality of video conferencing functions comprises one or more video conferencing functions for starting a video conference, and the method further comprises:
  receiving, by the video conference start widget, a command to start a video conference; and
  outputting in response to the command, by the video conference start widget, a signal configured to cause the video conference start widget to interact with the video conference provider to start the video conference and provide at least one video or audio stream from the video conference to a software application associated with the video conference start widget.

19. The method of claim 15, wherein the video conference widget is a video conference profile widget and the plurality of video conferencing functions comprises one or more video conferencing functions for providing contextual information for a user of a video conference, and the method further comprises:
  receiving, by the video conference profile widget, a command requesting contextual information for the user; and
  outputting in response to the command, by the video conference profile widget, a signal configured to cause the video conference profile widget to interact with the video conference provider to request contextual information for the user and provide the contextual information to a software application associated with the video conference profile widget.

20. The method of claim 15, wherein the video conference widget is a video conference recordings widget and the plurality of video conferencing functions comprises one or more video conferencing functions for providing a recording of a video conference, and the method further comprises:
  receiving, by the video conference recording widget, a command requesting a recording a video conference; and
  outputting in response to the command, by the video conference recordings widget, a signal configured to cause the video conference recordings widget to interact with the video conference provider to request the recording of the video conference from the video conference and provide the recording of the video conference to a software application associated with the video conference recordings widget.

* * * * *